(12) United States Patent
Vosbikian

(10) Patent No.: US 7,735,453 B2
(45) Date of Patent: Jun. 15, 2010

(54) BIRD FEEDER WITH REMOVABLE FEEDING TRAY

(76) Inventor: Peter S. Vosbikian, 408 Pond View Dr., Moorestown, NJ (US) 08057

( * ) Notice: Subject to any disclaimer, the term of this patent is extended or adjusted under 35 U.S.C. 154(b) by 217 days.

(21) Appl. No.: 12/148,423

(22) Filed: Apr. 18, 2008

(65) Prior Publication Data

US 2009/0260576 A1  Oct. 22, 2009

(51) Int. Cl.
*A01K 39/01* (2006.01)
(52) U.S. Cl. ................................ 119/52.2
(58) Field of Classification Search .......... 119/57, 119/52.2, 57.8, 55, 51.01, 51.03, 531
See application file for complete search history.

(56) References Cited

U.S. PATENT DOCUMENTS

| | | | | |
|---|---|---|---|---|
| 2,298,398 A | * | 10/1942 | Marshaus | 119/51.5 |
| 2,591,459 A | * | 4/1952 | Meany | 119/52.1 |
| 3,734,061 A | * | 5/1973 | Kraus | 119/52.2 |
| 5,062,390 A | * | 11/1991 | Bescherer et al. | 119/72 |
| 6,443,095 B1 | * | 9/2002 | McMahon | 119/51.01 |
| D488,590 S | * | 4/2004 | Fort, II | D30/124 |
| 6,895,894 B2 | * | 5/2005 | Fort, II | 119/57.8 |
| 7,219,621 B2 | * | 5/2007 | Coroneos | 119/57.1 |
| 7,409,922 B1 | * | 8/2008 | Baynard et al. | 119/52.3 |

* cited by examiner

*Primary Examiner*—Rob Swiatek
*Assistant Examiner*—Ebony Evans
(74) *Attorney, Agent, or Firm*—Stuart M. Goldstein

(57) ABSTRACT

A bird feeder has a bird food storage container, an upper feeding station platform, and a feeder base assembly located below and spaced apart from the container and the platform. The base assembly is attached to the container by an elongated bolt and threaded nut attachment, so it is thus easily separated from the container for ease of cleaning and food replenishment. The base assembly is made up of a feeder tray which catches and collects fallen food from the container, and a tray holder. The feeder tray, removeably mounted within the tray holder, has a perforated bottom with holes sized for water drainage, but which are sized small enough to retain bird food on the tray. The feeder tray also has a circumscribing upper rim which allows for easy removal and replacement of the tray from and into the tray holder. The tray holder has a circumscribing upper perch rim, spaced apart from the rim of the feeder tray when the tray is positioned within the holder. The perch rim provides support for larger birds while they are eating from the feeder tray.

15 Claims, 3 Drawing Sheets

BIRD FEEDER WITH REMOVABLE FEEDING TRAY

BACKGROUND OF THE INVENTION

A common problem with refillable hanging bird feeders is that large amounts of bird food are wasted as it falls from the feeders during the feeding process. Most feeders do no have provision for recovering and recycling this food to the birds. Food which is dropped from feeders to the ground is usually lost to squirrels, chipmunks, and other ground animals.

In addition, many bird feeders do not have the capability to be contemporaneously supplied with different types of bird food, in order to target different types of birds. Further, birds of various sizes have difficulty feeding at the same feeder, since feeders are most often designed for varieties of birds which are similar in size.

Some bird feeders use trays on which bird food is placed. However, the trays used on these types of feeders are not well supported, nor are they adequate to hold perching birds or to allow them ready access to food on the trays. Such food tray feeders also do not have easily separable components for ease of cleaning and refilling of food.

SUMMARY OF THE INVENTION

It is thus an object of the present invention to overcome the limitations and disadvantages of prior bird feeders.

It is an object of the present invention to provide a bird feeder which is configured to catch and retrieve bird food which falls from an upper feeding station of the feeder.

It is another object of the present invention to provide a bird feeder which retrieves fallen bird food and collects it for consumption by birds.

It is still another object of the present invention to provide a bird feeder which can be filled with different types of bird food at the same time to attract different varieties of birds.

It is a further object of the present invention to provide a bird feeder which can accommodate birds of various sizes.

It is still a further object of the present invention to provide a bird feeder which has a fixedly attached feeder tray to support perched birds, including large birds, feeding at the tray.

It is another object of the present invention to provide a bird feeder which has a separable feeder base assembly with a tray holder, which allows ease of cleaning of the tray and refilling of food onto the tray.

These and other objects are accomplished by the present invention, a bird feeder with a bird food storage container, an upper feeding station platform, and a feeder base assembly located below and spaced apart from the container and the platform. The base assembly is attached to the container by an elongated bolt and threaded nut attachment, so it is thus easily separated from the container for ease of cleaning and food replenishment. The base assembly is made up of a feeder tray, which catches and collects fallen food from the container, and a tray holder. The feeder tray, removeably mounted within the tray holder, has a perforated bottom with holes sized for water drainage, but which are sized small enough to retain bird food on the tray. The feeder tray also has a circumscribing upper rim which allows for easy removal and replacement of the tray from and into the tray holder. The tray holder has a circumscribing upper perch rim, spaced apart from the rim of the feeder tray when the tray is positioned within the holder. The perch rim provides support for larger birds while they are eating from the feeder tray.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
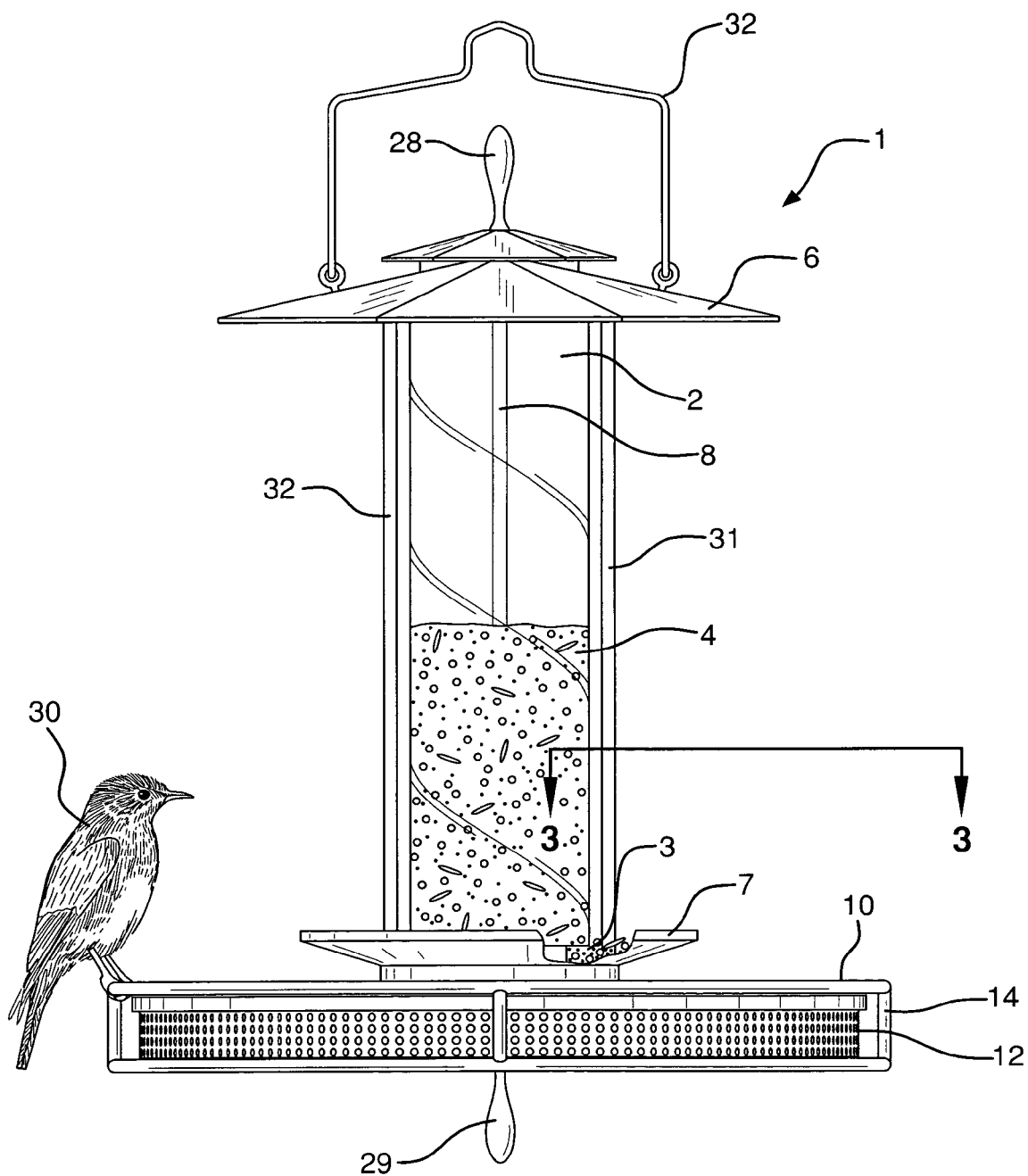
FIG. 1 is an elevation view of the bird feeder of the present invention.
Figure 2:
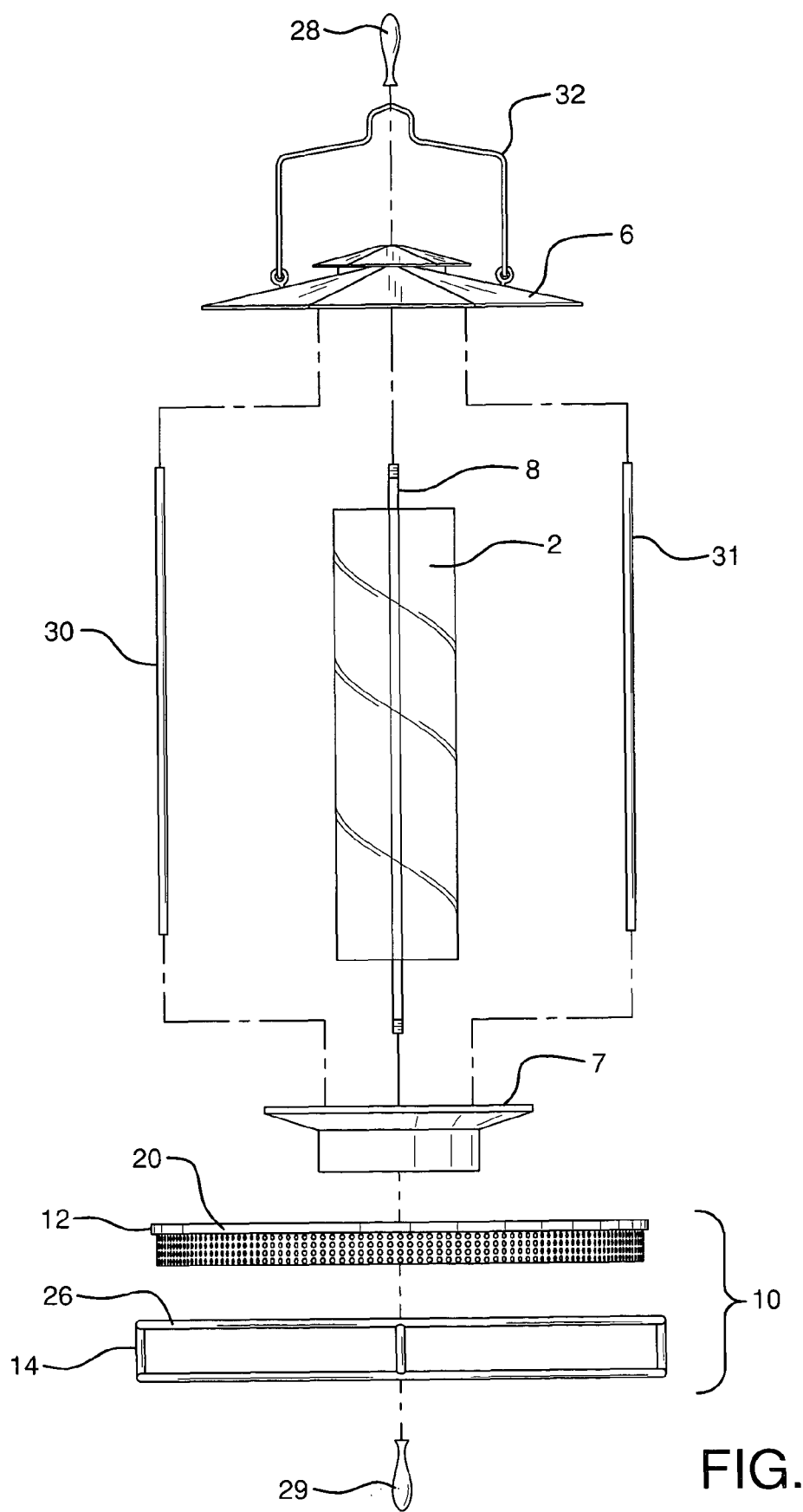
FIG. 2 is an exploded view of the components of the bird feeder of the present invention.
Figure 3:
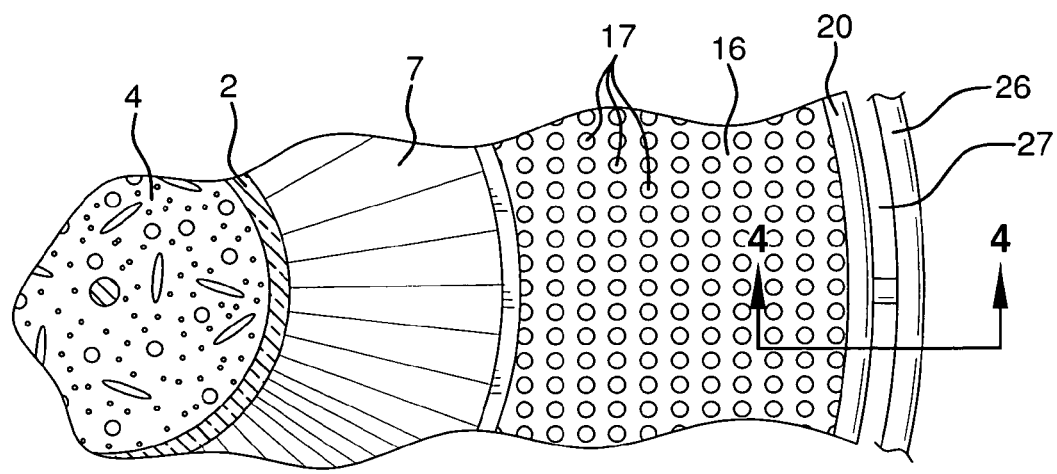
FIG. 3 is a partial top view taken from FIG. 1.
Figure 4:
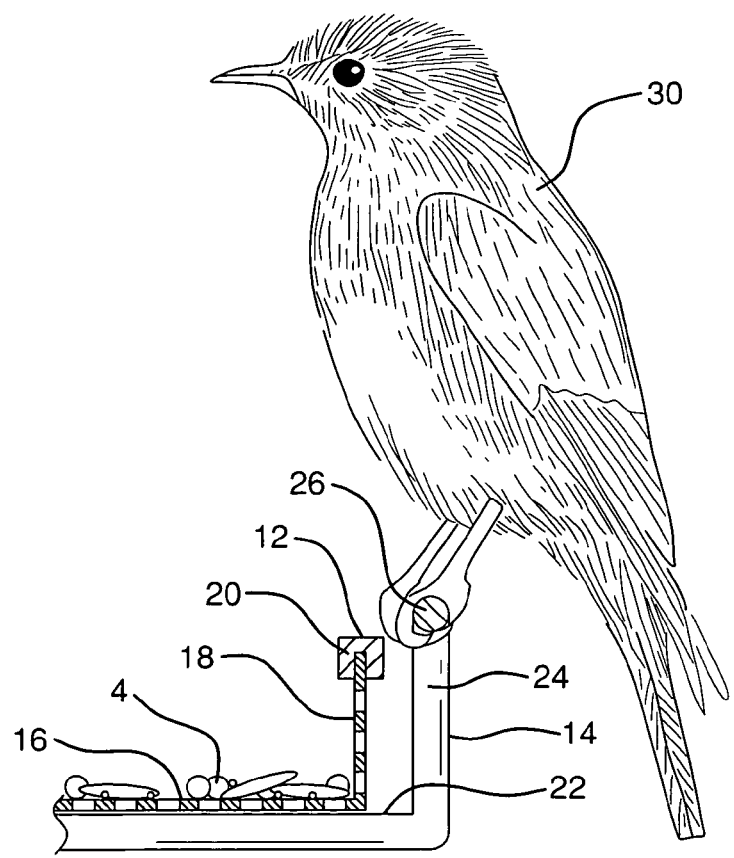
FIG. 4 is a partial sectional view taken from FIG. 3, and showing the placement of bird food on the feeder tray of the invention.

Bird feeder 1 comprises storage container 2 for housing bird food or feed 4. Removeable cover 6 rests on and is removeable from container 2, allowing for refilling of the container. Container 2 rests on upper feeding station platform 7, which is also removeable from the container. Bird food 4 falls onto platform 7 from access opening 3 located at the lower end of container 2. Elongated connector bolt 8, with threads at each end, extends from cover 6, completely through container 2 and platform 7.

At its lowermost end, bolt 8 also extends through feeder base assembly 10, which is independent of and separable from container 2. Base assembly 10 comprises feed tray 12 and tray holder 14. Feed tray 12 comprises flat planar bottom 16 and upstanding side wall 18, circumscribing the bottom. Side wall 18 terminates, at its upper end, with rim 20 above and circumscribing feeder tray bottom 16. Bottom 16 of feed tray 12 is perforated with holes 17 which are sized to drain water, but are small enough to prevent bird feed from dropping through the holes and, hence from base assembly 10.

Tray holder 12 supports feeder tray 10 by means of tray holder bottom 22 on which feeder tray 12 is positioned. It is contemplated that tray holder bottom 22 will consist of a plurality of supporting bars which extend across the bottom of tray holder 14. Side wall 24, upstanding from tray holder bottom 22, terminates at perch rim 26. Wall 24 and perch rim 26 both circumscribe tray holder bottom 22 and the entire tray holder 14. Perch 26 is located in spaced apart relation to rim 20 of feed tray 12, forming gap 27 therebetween. As previously described, feed tray 12 is configured to be removeably positioned within tray holder 14. Just as feeder base assembly 10 is independent of and separable from container 2, feed tray 12 and tray holder 14 are also separable components within the base assembly.

As referenced above, all the components of bird feeder 1 are attached by means of elongated bolt 8, extending through cover 6, container 2, platform 7, feed tray 12, and tray holder 14. Ornamental threadable nuts 28 and 29 secure bolt 8 in position through the components of bird feeder 1. Elongated rods 30 and 31 can be threadably connected between cover 6 and platform 7 to provide added support to bird feeder 1. Hanger 32 is also provided and connected to cover 6.

In use, bird feeder 1 is assembled, by means of bolt 8 and nuts 28 and 29, such that base assembly 10 is connected below and in spaced apart relation to container 2. Bird food 4 flows from container 2 onto upper platform 7, which is the primary food supply for birds eating at feeder 1. As birds feed from platform 7, much of bird food 4, normally lost from a conventional bird feeder, will fall from platform 7. However, rather than dropping to the ground, bird food 4 is recovered onto base assembly 10, and specifically on feed tray 12.

As bird food 4 collects on feed tray 12, an additional source of food is available to feed birds. While positioned on perch rim 26, birds 30 have free access to food which has fallen from container 2. Perforations 17 within feed tray 12 and spaces between the support bars of tray holder bottom 22 allow drainage of water from base assembly 10, but maintains fallen bird food on feeder tray 12.

Feed tray 12 can be easily and simply removed for cleaning, emptying, or other purposes, by disconnecting nut 29 from bolt 8 and lowering base assembly 10 from container 2. Feeder tray 12 can then be simply taken off tray holder 14 and, after emptying and cleaning, replaced on the tray holder and reconnected, via bolt 8 and nut 29 to storage container 2.

Thus, a bird feeder is provided which will not only permit recovery of otherwise lost bird food which falls from the feed storage container, but also provides feeding birds with a perch rim for easy access to the fallen, recovered feed. Feeder tray 12 also provides a feeding platform for providing additional bird food for feeding birds. Larger birds who may not be able to gain ready access to food in storage container 2 via platform 7, can sit on perch rim 26 and eat from feed tray 12.

Bird feeder 1 also provides a means to feed different types of birds with various feeds. Feed for one type of bird can be stored in container 2 and different food, targeted for other varieties of birds, can be placed directly on feed tray 12.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A bird feeder comprising:
   a storage container for housing bird food having means for providing food from the container to a feeding station platform, said feeding station platform being located immediately beneath the storage container;
   tray means located below and in spaced apart relation to the storage container and feeding station platform for catching and collecting food which falls from the feeding station platform, said tray means comprising a planar bottom onto which the food falls and a rim extending above and substantially circumscribing the planar bottom;
   holder means for supporting the tray means, the tray means being positioned directly on the holder means, said holder means further comprising upstanding perch means substantially circumscribing the tray means to allow birds to roost on the perch means and gain access to food on the tray means, said perch means being located above the rim; and
   a connector extending through the feeding station platform, the tray means and the holder means;
   attachment means for removeably securing the connector within the feeding station platform, the tray means and the holder means, whereby when the attachment means is removed from the connector, the feeding station platform, the tray means and the holder means are separated from each other and the storage container.

2. The bird feeder as in claim 1 wherein the upstanding rim of the tray means is in spaced apart relation to the perch means, forming a gap between the rim and perch means.

3. The bird feeder as in claim 1 wherein the holder means comprises a tray holder.

4. The bird feeder as in claim 1 wherein the planar bottom is perforated.

5. The bird feeder as in claim 1 wherein the attachment means comprises a threaded nut.

6. The bird feeder as in claim 1 wherein the connector is an elongated threaded bolt.

7. The bird feeder as in claim 6 wherein the threaded nut secures the threaded bolt at a location beneath the support means.

8. The bird feeder as in claim 1 wherein the perch means comprises a ring.

9. A bird feeder comprising:
   a bird feed storage container with means for providing access to food from the container to a feeding station platform, said feeding station platform being located immediately beneath the storage container;
   a feeder base assembly independent of and separable from the storage container and feeding station platform, said base assembly comprising a tray located below and in spaced apart relation to the storage container, said tray having a planar bottom and a rim extending above and substantially circumscribing the planar bottom, and a tray holder supporting the tray, the tray being positioned directly on the tray holder, said tray holder comprising an upstanding perch located above the rim and substantially circumscribing the tray; and
   a connector extending through the feeder base assembly and the feeding station platform;
   attachment means for removeably securing the feeder base assembly and the storage container and feeding station platform, whereby when the attachment means is removed from the connector, the feeder base assembly is separable from the storage container and the feeding station platform, and the tray and the tray holder are separable and independent from each other.

10. The bird feeder as in claim 9 wherein the rim is in spaced apart relation to the perch, forming a gap between the rim and perch.

11. The bird feeder as in claim 10 wherein the planar bottom is perforated.

12. The bird feeder as in claim 10 wherein the attachment means comprises a threaded nut.

13. The bird feeder as in claim 12 wherein the connector is an elongated threaded bolt.

14. The bird feeder as in claim 13 wherein the threaded nut secures the threaded bolt at a location beneath the base assembly.

15. The bird feeder as in claim 10 wherein the perch comprises a ring.

* * * * *